(12) United States Patent
Glerum

(10) Patent No.: US 10,857,916 B2
(45) Date of Patent: Dec. 8, 2020

(54) SEAT BELT TENSION INDICATOR

(71) Applicant: Chad Glerum, Pennsburg, PA (US)

(72) Inventor: Chad Glerum, Pennsburg, PA (US)

( * ) Notice: Subject to any disclaimer, the term of this patent is extended or adjusted under 35 U.S.C. 154(b) by 431 days.

(21) Appl. No.: 15/952,363

(22) Filed: Apr. 13, 2018

(65) Prior Publication Data

US 2018/0297495 A1 Oct. 18, 2018

Related U.S. Application Data

(60) Provisional application No. 62/484,935, filed on Apr. 13, 2017.

(51) Int. Cl.
| | |
|---|---|
| *B60N 2/28* | (2006.01) |
| *G01L 5/06* | (2006.01) |
| *B60R 22/10* | (2006.01) |
| *B60R 22/48* | (2006.01) |

(52) U.S. Cl.
CPC ......... *B60N 2/2803* (2013.01); *B60N 2/2806* (2013.01); *B60N 2/2812* (2013.01); *B60R 22/105* (2013.01); *G01L 5/06* (2013.01); *B60N 2002/2815* (2013.01); *B60R 2022/4841* (2013.01)

(58) Field of Classification Search
CPC .. B60N 2/2803; B60N 2/2812; B60N 2/2806; B60N 2002/2815; B60R 22/105; B60R 2022/4841; G01L 5/06; G01L 5/047
See application file for complete search history.

(56) References Cited

U.S. PATENT DOCUMENTS

| | | | | |
|---|---|---|---|---|
| 3,381,268 A | * | 4/1968 | Boblitz | F02N 15/10 180/270 |
| 3,817,093 A | * | 6/1974 | Williams | G01L 5/107 73/862.474 |
| 3,871,090 A | * | 3/1975 | Romanzi, Jr. | A44B 11/2515 200/61.58 B |
| 4,300,129 A | * | 11/1981 | Cataldo | G08B 6/00 116/DIG. 17 |
| 4,424,509 A | * | 1/1984 | Andres | B60R 22/185 116/203 |
| 4,893,835 A | * | 1/1990 | Linden | B60R 22/024 280/808 |
| 4,943,087 A | * | 7/1990 | Sasaki | B60R 22/06 280/804 |
| 5,060,977 A | * | 10/1991 | Saito | B60R 22/023 200/61.45 M |
| 5,728,953 A | * | 3/1998 | Beus | G01G 3/12 73/862.392 |
| 5,898,366 A | * | 4/1999 | Brown | B60R 22/48 180/270 |
| 6,079,744 A | * | 6/2000 | Husby | G01D 5/147 280/801.1 |

(Continued)

*Primary Examiner* — Nimeshkumar D Patel
*Assistant Examiner* — Tania Courson

(57) ABSTRACT

The present invention is directed to child safety seats, and more particularly to a harness or belt tensioning indicator for a child safety seat harness system. The tension indicator includes a body portion for receiving a belt, harness or webbing. The tension indicator also includes a sliding indicator that is capable of moving from a first, unactuated position to a second, actuated position when the belt, harness or webbing that is received in the body portion is tensioned from a first tension to a second, correct tension.

20 Claims, 6 Drawing Sheets

(56) References Cited

U.S. PATENT DOCUMENTS

| | | | | |
|---|---|---|---|---|
| 6,205,868 B1* | 3/2001 | Miller | B60R 21/01556 | |
| | | | 73/862.391 | |
| 6,508,114 B2* | 1/2003 | Lawson | G01L 5/101 | |
| | | | 73/159 | |
| 6,520,588 B1* | 2/2003 | Busch | B60R 22/26 | |
| | | | 280/808 | |
| 6,554,318 B2* | 4/2003 | Kohut | B60R 21/013 | |
| | | | 180/268 | |
| 6,623,032 B2* | 9/2003 | Curtis | B60R 22/00 | |
| | | | 280/735 | |
| 6,722,212 B2* | 4/2004 | Specht | G01L 5/10 | |
| | | | 24/633 | |
| 6,796,192 B2* | 9/2004 | Sullivan | B60R 22/48 | |
| | | | 73/862.391 | |
| 6,843,143 B2* | 1/2005 | Steele | G01L 5/103 | |
| | | | 73/862.393 | |
| 6,851,503 B2* | 2/2005 | Almaraz | B60R 22/48 | |
| | | | 180/268 | |
| 6,854,415 B2* | 2/2005 | Barnes | B60N 2/2806 | |
| | | | 116/202 | |
| 7,148,809 B2* | 12/2006 | Enomoto | B60N 2/265 | |
| | | | 340/686.1 | |
| 7,242,286 B2* | 7/2007 | Knox | B60R 22/48 | |
| | | | 340/457.1 | |
| 7,252,307 B2* | 8/2007 | Kanbe | B60R 22/18 | |
| | | | 280/801.1 | |
| 7,347,452 B2* | 3/2008 | Maloney | B60R 22/18 | |
| | | | 180/268 | |
| 8,272,689 B2* | 9/2012 | Biaud | B60N 2/2812 | |
| | | | 297/250.1 | |
| 8,613,470 B2* | 12/2013 | Sickon | B60R 22/48 | |
| | | | 280/801.1 | |
| 2006/0108847 A1* | 5/2006 | O'Callaghan | B60N 2/366 | |
| | | | 297/344.1 | |
| 2008/0251002 A1* | 10/2008 | Burleigh | B60N 2/2809 | |
| | | | 116/212 | |

* cited by examiner

SEAT BELT TENSION INDICATOR

CROSS-REFERENCE TO RELATED APPLICATIONS

The present application is a non-provisional application which claims priority to provisional application Ser. No. 62/484,935 filed on Apr. 13, 2017, which is incorporated in its entirety herein.

FIELD OF THE INVENTION

The present invention is generally directed to child safety seats, and more particularly to a harness or belt tensioning indicator for a child safety seat harness system.

BACKGROUND OF THE INVENTION

Child safety seats, or car seats, are well known for placement on a vehicle seat in order to safely position, secure, and restrain a child in the vehicle. Child safety seats are also well known to employ an on-board or dedicated harness system. A typical five-point harness system often employs a crotch strap, a pair of lap belts, and a pair of shoulder straps. The various straps and belts are connected to one another at a latch or buckle typically carried on the crotch strap. The length of the various straps and belts is adjustable in order to accommodate children of different size and to accommodate a growing child.

It is well known that parents do not always know how to correctly tension the harness system to properly and safely secure their child in a safety seat with the child restraint system of the seat. Currently, most child restraint systems require the parent or caregiver to manually adjust a central harness strap at a central adjuster. Many parents have difficulty performing this manual harness tensioning operation to tension the belt on the child correctly.

As such, there exists a need for a simple indicator device the will provide a visual indication that the tension on the harness is appropriate.

SUMMARY OF THE INVENTION

In one embodiment, the tension indicator assembly can be used to provide feedback that a harness is set to the appropriate tension when installed on a child in the child safety seat. In particular, the present invention preferably provides a harness tension indicator for a child seat that is able to provide visual feedback to a user that a correct tension is being applied to the harness after the child has been correctly placed and buckled in the safety seat.

Further areas of applicability of the present invention will become apparent from the detailed description provided hereinafter. It should be understood that the detailed description and specific examples, while indicating the preferred or exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
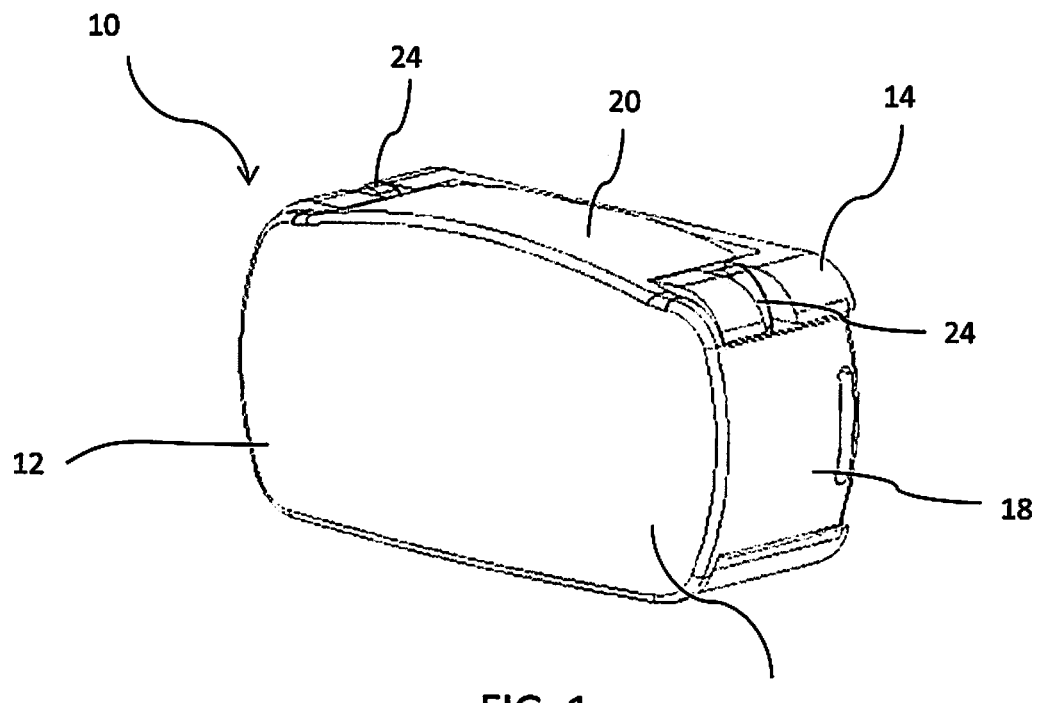
FIG. 1 is a front perspective view of one embodiment of an tension indicator assembly.

The following description of the preferred embodiment(s) is merely exemplary in nature and is in no way intended to limit the invention, its application, or uses.

With reference to FIGS. 1-4, an embodiment of a tension indicator assembly 10 (or indicator assembly 10) is shown. Although the tension indicator assembly 10 will be discussed in the context of a child safety seat, it is contemplated that the tension indicator assembly 10 can be used in any system that employs a harness, belt, webbing or similar structure that is tensioned. The tension indicator assembly 10 may be made of plastic, metal, or a combination of plastic and metal. Similarly, the components contained within and comprise the indicator assembly 10 may be made of plastic or metal or a combination of plastic and metal.

The indicator assembly 10 may include a front plate assembly 12 and a rear plate assembly 14 which forms the body portion 11. The front plate assembly 12 may include a face portion 16 and at least one lateral flange 18 and at least one medial flange 20 extending from the face portion. In one embodiment, the front plate assembly 12 includes two lateral flanges 18, one on the left lateral side and one on the right lateral side of the front plate assembly 12. The front plate assembly 12 also includes, in one embodiment, two medial flanges 20, one on the upper side and one on the lower side of the front plate assembly 12. The at least one flange 18 is configured and dimensioned to engage or otherwise couple to the rear plate assembly 14 and the at least one medial flange 20 extends towards but does not engage the rear plate assembly 14 leaving a slot or opening 5, 7 between the front plate assembly 12 and the rear plate assembly 14. The slot 5, 7 is configured and dimensioned to allow a harness or belt 9 to pass there through.

In one embodiment, the left and right lateral flanges 18 engage the rear plate assembly 14 to couple the front plate assembly 12 and the rear plate assembly 14 together. The lateral flanges 18 engage the rear plate assembly 14 through a snap-fit or flexible, biased connection. Other forms of connection that are known in the art are also contemplated, such as an interference fit or a hinge fit. The upper and lower medial flanges 20 extend towards the rear plate assembly 14 but dot not engage the rear plate assembly 14 leaving an upper slot and a lower slot between the upper portion of the front plate assembly 12 and the rear plate assembly 14 for a belt, harness, or webbing to pass through the slots and, thus, the indicator assembly 10. The belt, harness, or webbing passing through the indicator assembly 10 can best be seen in FIGS. 5 and 6.

Figure 2:
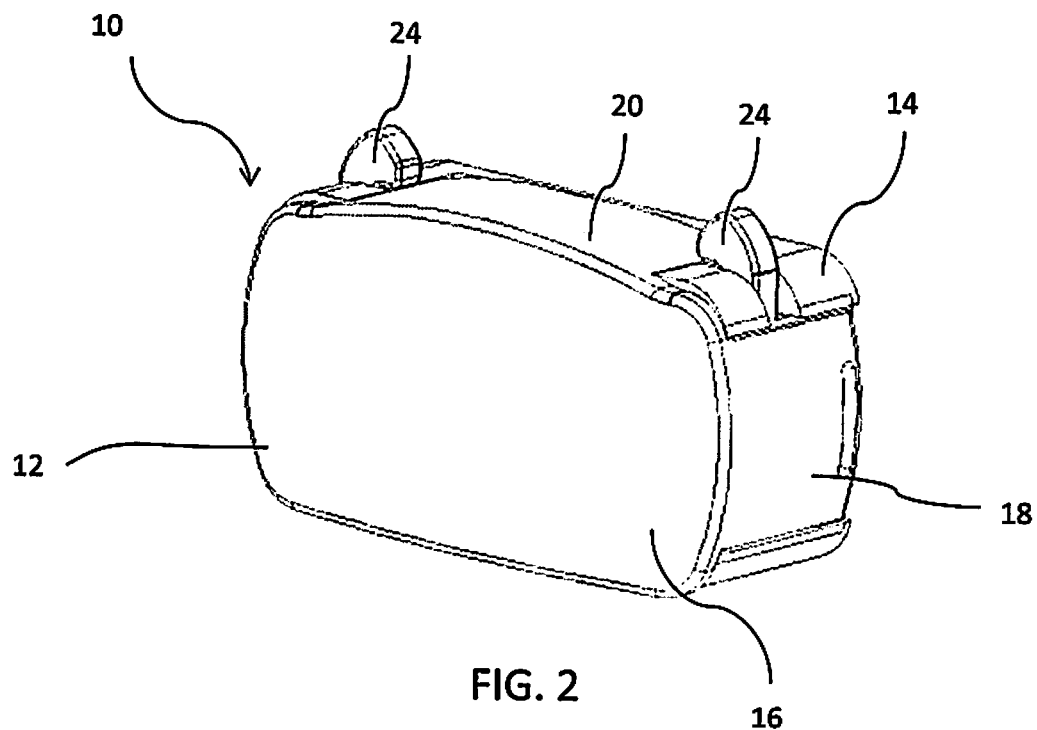
FIG. 2 is a front perspective view of the tension indicator assembly of FIG. 1 with the indicator actuated.
Figure 3:
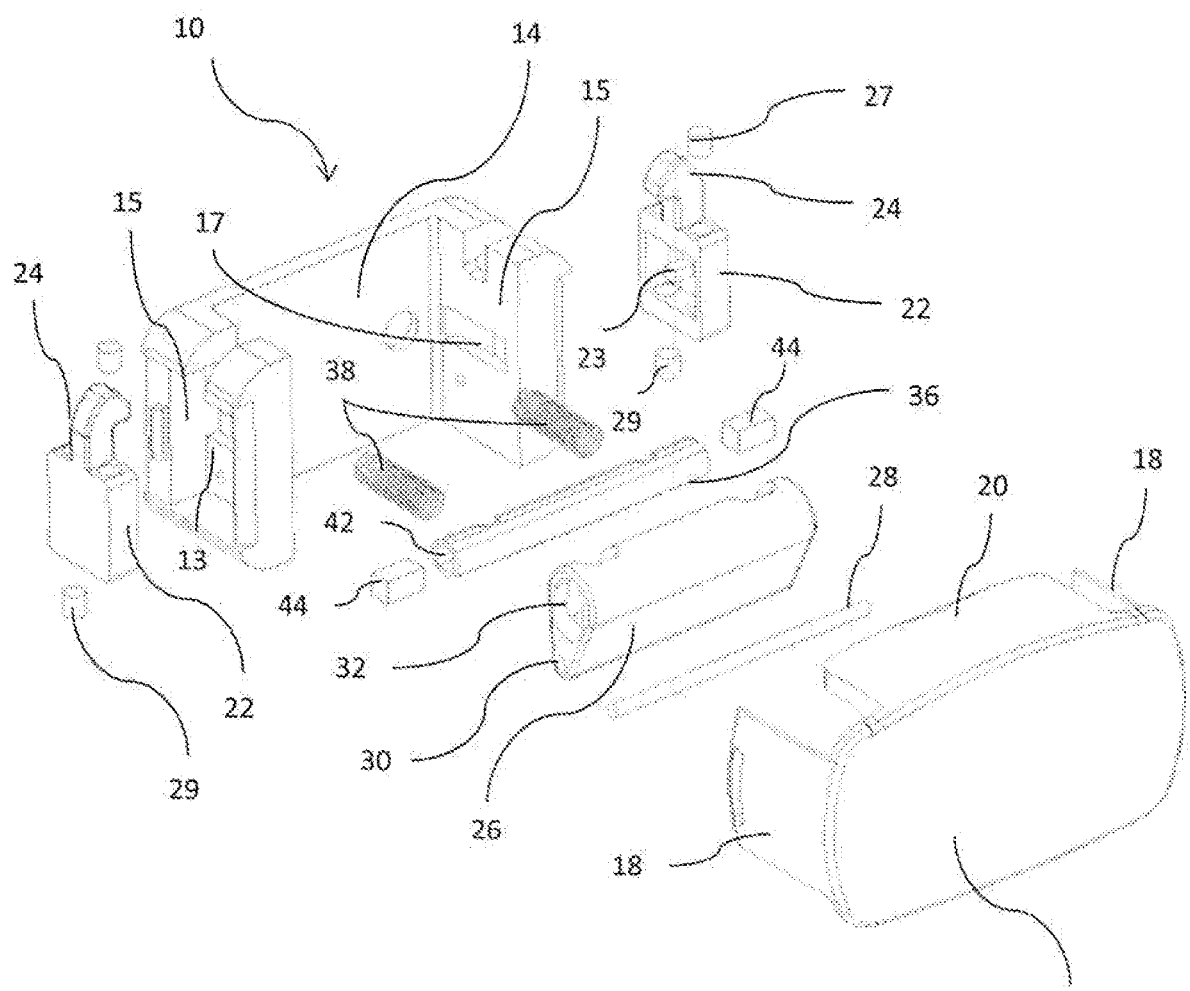
FIG. 3 is an exploded front perspective view of the tension indicator assembly of FIG. 1.
Figure 4:
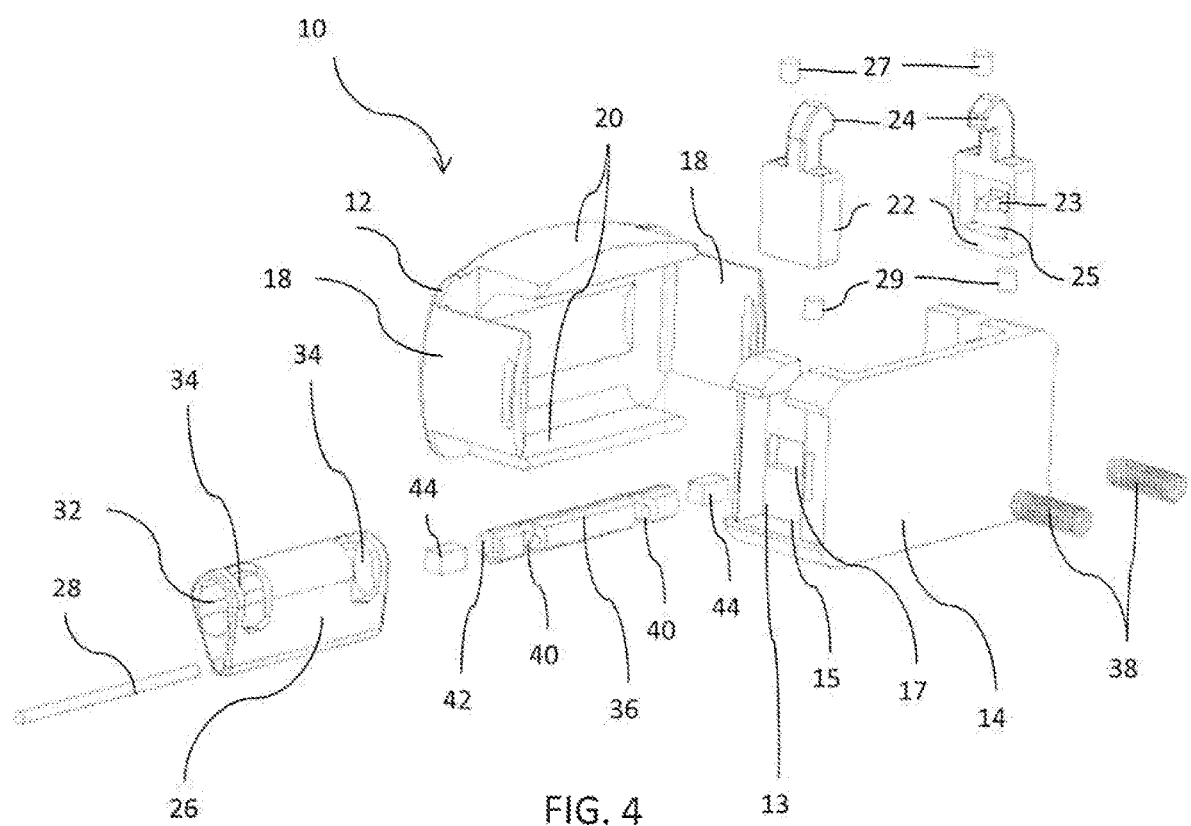

The indicator assembly 10 may include at least one slide indicator 22 which slidingly engages the rear plate assembly 14, and more specifically slidingly engages with a track 13 in legs 15 of the rear plate assembly 14. In an exemplary embodiment, there are two slide indicators 22 located on opposite lateral sides of the indicator assembly 10. Since the slide indicators 22 are identical, the features of the slide indicator 22 will be discussed with respect to one slide indicator 22, but it should be understood that such description applies to both slide indicators 22. The slide indicator 22 may include a guide portion or protrusion 23 located centrally on one side of the slide member 22. Surrounding the guide portion 23 is a hollowed out portion or groove 25. The groove 25 is configured and dimensioned to receive a lateral portion of a magnetic member, 44 which is housed inside the lateral portion of a slide bar 36, discussed below. Slide indicator 22 may also include first and second magnetic members 27 and 29. The magnetic members 27 and 29 are located on opposite ends of the slide indicator 22 such that the first magnetic member 27 is located on the upper end of slide indicator 22, proximate an extension portion 24, and the second magnetic member 29 is located on the lower end of the slide indicator 22. FIG. 1 shows the slide indicator 22 in a first or =actuated position and FIG. 2 shows the slide indicator 22 in a second or actuated position. In the actuated position, the extension portion 24 of the slide indicator 22 extends above or beyond the front 12 and rear 14 plate assemblies. It is contemplated that the slide indicators 22 can be actuated simultaneously or can be actuated sequentially. The operation of the slide indicator 22 is discussed further below.

With continued reference to FIGS. 1-4, in one embodiment the indicator assembly 10 may also include a pivot housing 26 and a pivot bar 28 that is received within a bore 30 in the pivot housing 26. The pivot bar 28 is received between the legs 15 of the rear plate assembly 14 and serves as an anchor or pivot point for the pivot housing 26. In one embodiment, the pivot bar 28 is captured between the legs 15 of the rear plate assembly 14 such that the pivot bar 28 cannot move with respect to the rear plate assembly 14. The pivot housing 26 is also received between the legs 15 of rear plate assembly 14 and is capable of pivoting around pivot bar 28. In one embodiment, the pivot housing 26 may also include an elongated bore 32 and at least one elongated opening 34. The elongated bore 32 is configured and dimensioned to receive a slide bar 36, discussed below, while the at least one elongated opening 34 provides clearance for at least one biasing member 38 to pass there through, also discussed below. In an exemplary movement, as the pivot housing 26 pivots around the pivot bar 28, the slide bar 36 moves from an upper portion of the elongated bore 32, shown in FIG. 5, to a lower portion of the elongated bore 32, shown in FIG. 6. The dimensions of the elongated bore 32 provide the clearance for the pivot housing 26 to pivot about pivot bar 28 while allowing the slide bar 36 to remain vertically stationary.

Figure 5:
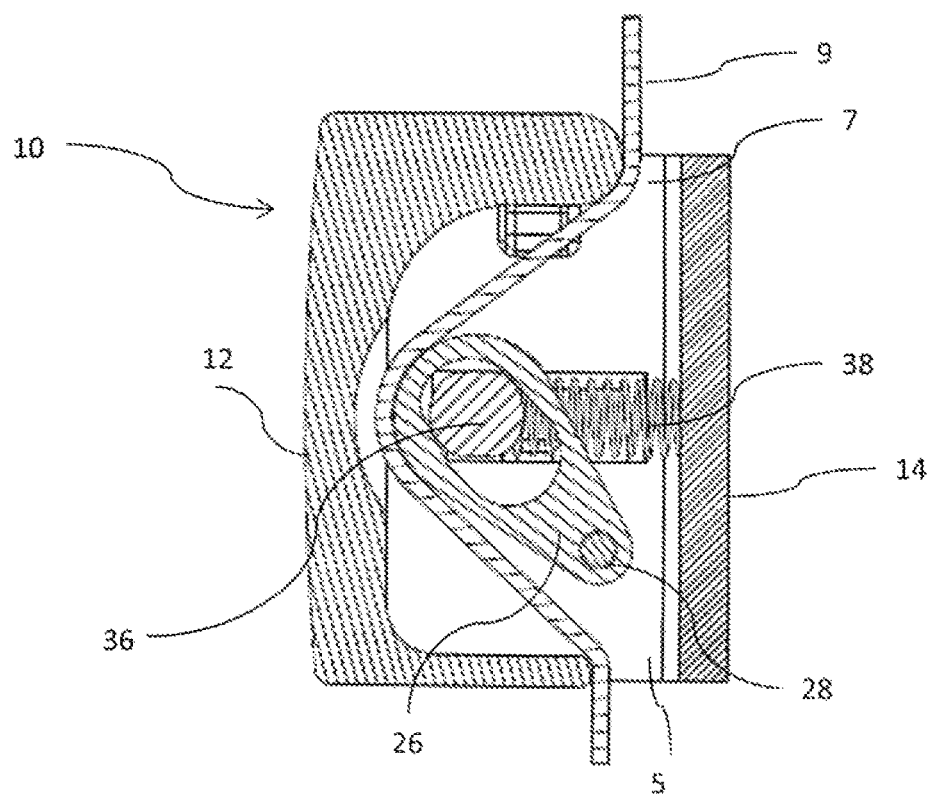
FIG. 5 is a cross sectional view of the tension indicator assembly of FIG. 1.
Figure 6:
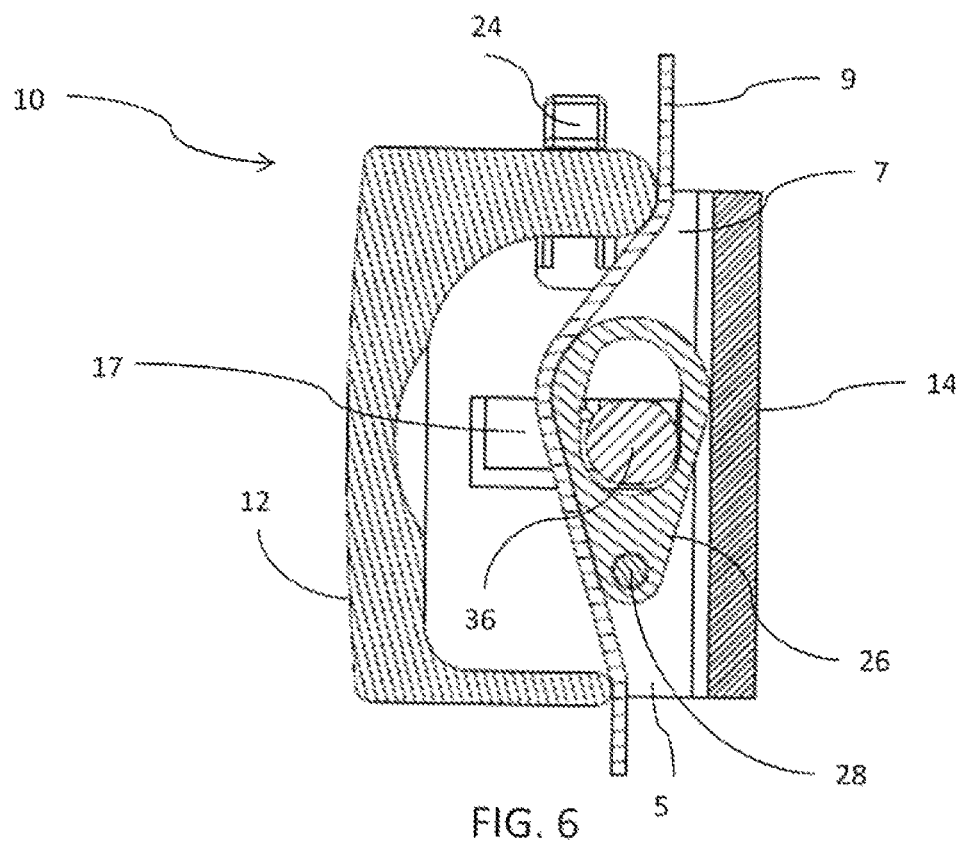
FIG. 6 is a cross sectional view of the tension indicator assembly of FIG. 1 with the indicator actuated.
Figure 7:
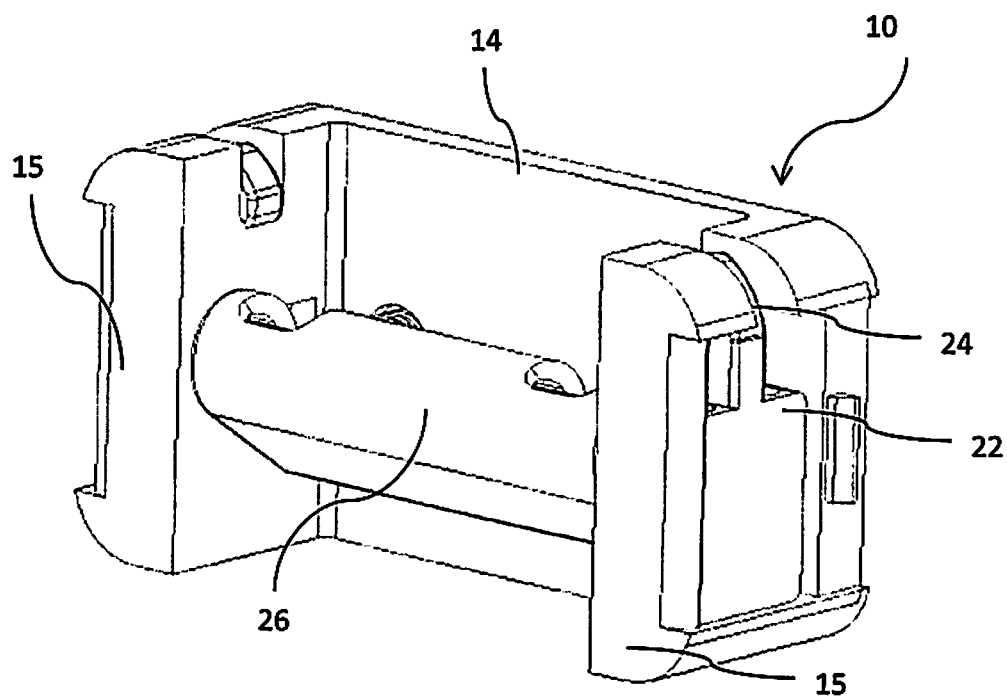
FIG. 7 is a front perspective view of the tension indicator assembly of FIG. 1 with the front plate removed.
Figure 8:
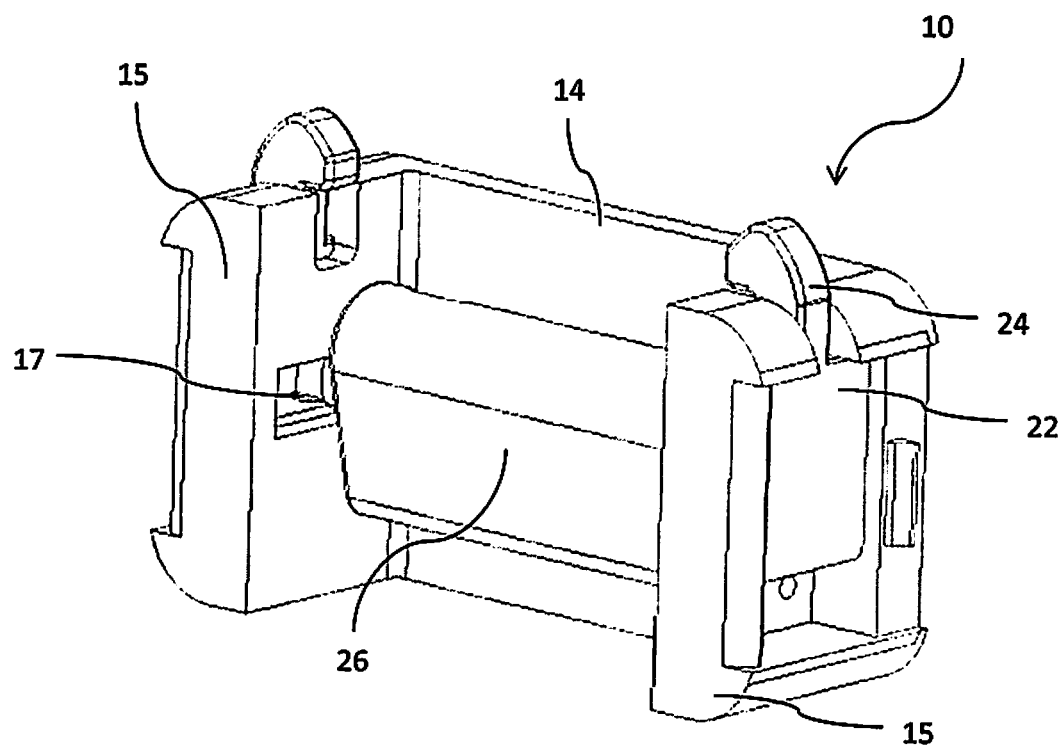
FIG. 8 is a front perspective view of the tension indicator assembly of FIG. 1 with the front plate removed and the indicator actuated.
Figure 9:
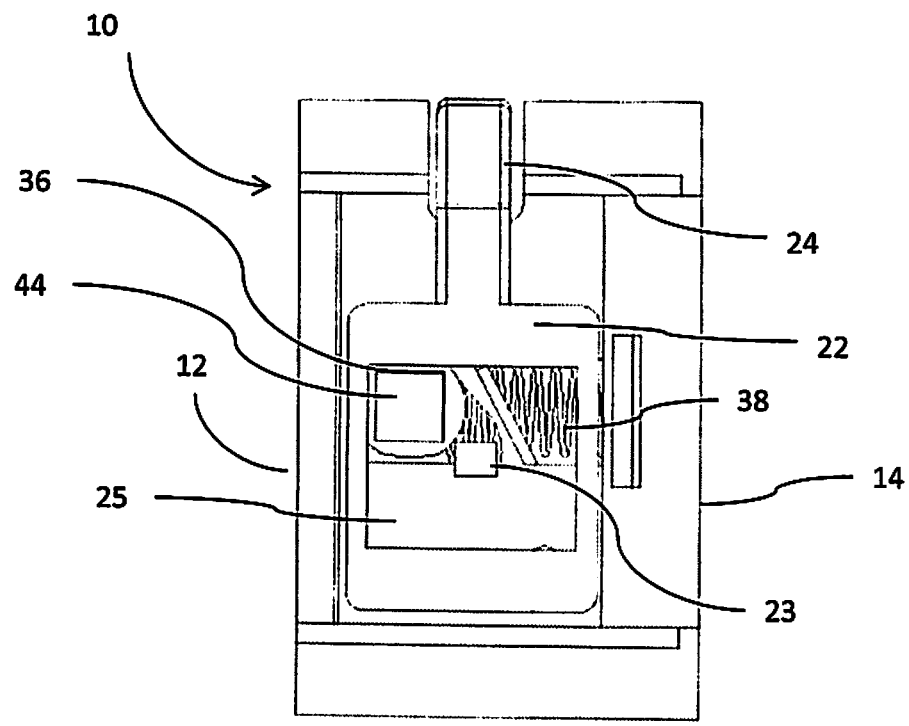
FIG. 9 is a partial cross sectional view of the tension indicator assembly of FIG. 1.
Figure 10:
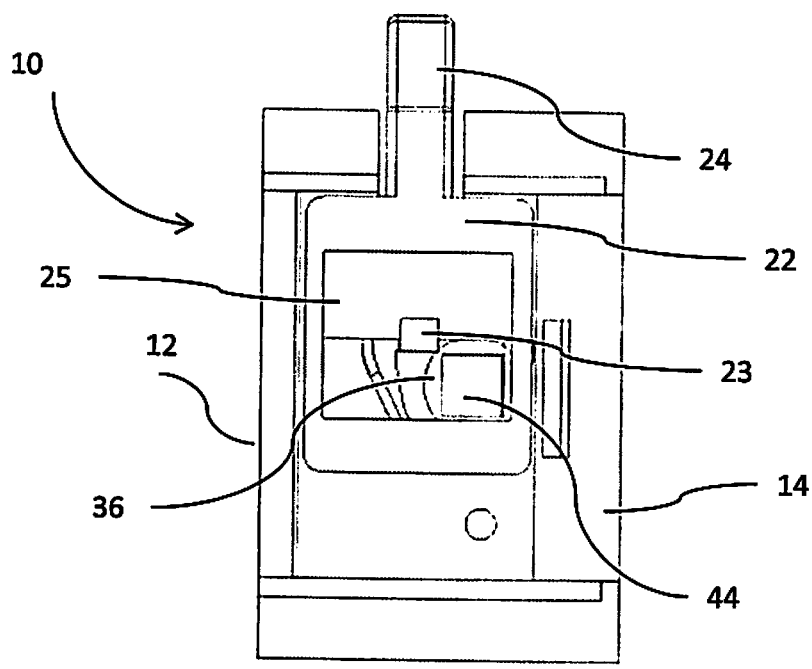
FIG. 10 is a partial cross sectional view of the tension indicator assembly of FIG. 1 with the indicator actuated.

In one embodiment, the indicator assembly 10 may include the slide bar 36. The slide bar 36 is received within the elongated bore 32 and moves within the elongated bore 32 as best seen in FIGS. 5 and 6 and described above. The slide bar 36 may include at least one opening 40 for receiving at least a portion of the at least one biasing member 38 and may include at least lateral opening 42 for receiving a lateral magnetic member 44. The slide bar 36, in one embodiment, is longer than the elongated bore 32 and the distance between the legs 15. Accordingly, to accommodate the slide bar 36, the legs 15 include slots 17. As best seen in FIGS. 9 and 10, the lateral ends of the slide bar 36 extend through the slots 17 in the legs 15 and reside in the grooves 25 of the slide indicators 22. In other words, the lateral ends of slide bar 36, which contain the lateral magnetic members 44, are received through the slots 17 and in the grooves 25 of the slide indicators 22. In an exemplary movement, the slide bar 36 is constrained to a horizontal movement because of the slots 17 in the legs 15 prevent the slide bar 36 from moving in a vertical direction.

In one embodiment, the indicator assembly 10 may include the biasing members 38. Although two biasing members 38 are shown in an exemplary embodiment, it is contemplated that one or more than two biasing members can be used. Since the biasing member 38 are identical, the features of the biasing member 38 will be discussed with respect to one biasing member 38, but it should be understood that such description applies to both biasing members 38. Biasing member 38 is received between the slide bar 36 and the rear plate assembly 14 such that the biasing member 38 biases the slide bar 36 in a direction away from the rear plate assembly 14 towards the front plate assembly 12. In one embodiment, a first end of the biasing member 38 is received in opening 40 of slide bar 36, through the elongate opening 34 of the pivot housing 26, while the second end of the biasing member 38 is connected to the rear plate assembly 14. The spring or biasing force provided by the biasing members 38 is contemplated to be sufficient to prevent the slide bar 36 from moving towards the rear plate assembly 14 until a sufficient force is generated by tensioning the belt 9.

With reference to FIGS. 5-10, an exemplary use of the tensioning indicator 10 with a belt, harness, or web 9 will be explained. In an exemplary use, the front plate assembly 12 is uncoupled from the rear plate assembly 14. This can be seen in FIGS. 7 and 8. The belt 9 is then placed onto pivot housing 26 and the front plate assembly 12 is then coupled to the rear plate assembly 14.

FIG. 5 shows the tensioning device 10 with the belt 9 fed between the front plate assembly 12 and the rear plate assembly 14 in slot 5, 7. FIG. 5 also shows the tensioning device 10 in a first position, where the belt 9 has not yet been tensioned. In this position, the slide indicator 22 is in its unactuated position, as best seen in FIG. 1. Also, pivot housing 26 is pivoted in a forward position such that slide bar 36 is biased by biasing member 38 towards the front plate assembly 12. The biasing members 38 provide a strong enough spring or biasing force to counteract the initial tensioning of the belt 9. When the slide bar 36 is in this position, the lateral magnet member 44 aligns with first magnet member 27 in the slide indicator 22, magnetically attracting the first magnet member 27. Since the first magnet member 27 is located proximate the top portion of the slide indicator 22, slide indicator 22 is magnetically biased to the unactuated position. This exemplary arrangement of components provides the benefit of keeping the slide indicator 22 in the unactuated position until the correct belt tension is reached. In other words, this arrangement of components keeps the slide actuator 22 from actuating at an incorrect tension.

As the belt 9 is tensioned and sufficient tension force is applied, the belt 9 will push against pivot housing 26 causing pivot housing 26 to pivot towards the rear plate assembly 14. This can be best seen in FIGS. 8 and 9 which show the pivot housing 26 in a forward position and in a second pivoted position. As pivot housing 26 pivots, the slide bar 36 slides horizontally towards the rear plate assembly 14. Since the biasing members 38 are engaged with the slide bar 36, there has to be sufficient force generated by the tensioning of the belt 9 to overcome the biasing or spring force of the biasing members 38. The movement of slide bar 36, as mentioned earlier, is limited to only a horizontal movement by virtue of being captured in the elongate bore 32 and the slots 17. As slide bar 36 moves towards the rear plate assembly 14, the lateral magnet 44, which is located in the slide bar 36, magnetically decouple from the first magnet 27 in the slide indicator 22. FIGS. 9 and 10 best show the movement of the lateral magnets 44 from the forward position to the second position. Once the slide bar 36 has sufficiently moved rearwardly, the lateral magnet 44 will align with second magnet member 29 in the slide indicator 22, magnetically attracting the second magnet member 29. Since the first magnet member 29 is located proximate the bottom portion of the slide indicator 22, the slide indicator 22 is magnetically biased to the actuated position. Since the slide indicator is received in track 13 of leg 15 and since the lateral end of the lateral magnet 44 is in the groove 25, which is bounded by the protrusion 23, slide indicator 22 can only slide in a vertical direction and will only slide after the slide bar 36 is not vertically aligned with the protrusion 23. This exemplary arrangement of components provides the benefit of keeping the slide indicator 22 in the actuated position until there is sufficient release of the belt tension.

With sufficient release of the belt tension, the biasing member 38 pushes the slide bar 36 towards the front plate assembly 12. As the slide bar 36 is pushed forward, the lateral magnet 44, which is located in the slide bar 36, magnetically decouple from the second magnet 29 in the slide indicator 22. Once the slide bar 36 has sufficiently moved forwardly, the lateral magnet 44 will align with first magnet member 27 in the slide indicator 22, magnetically attracting the second magnet member 27. Since the first magnet member 27 is located proximate the top portion of the slide indicator 22, the slide indicator 22 is magnetically biased to the unactuated position and will slide back down.

As mentioned earlier and best seen in FIGS. 1 and 2, when sufficient tension is provided on the belt 9, the sliding indicator 22 will be in the actuated position and extension portion 24 will extend above the front and rear plate assemblies 12 and 14 providing the user with visual feedback the that correct tension is applied to the belt 9. Conversely, when sufficient slack is introduced to belt 9 such that the tension force supplied by belt 9 is less than the biasing force of biasing member 38, the sliding indicator 22 will be in the unactuated position providing visual feedback that the correct tension is no longer applied to belt 9. It is contemplated that with sufficient magnetic force, the sliding motion of the slide indicator 22 will result in an audibly snap. Accordingly, it is contemplated that this additional feedback in the form of an audible feedback can be included in this arrangement of components.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tension indicator comprising:
a body portion having a front plate assembly and a rear plate assembly, the front plate assembly being removably coupled to the rear plate assembly and defining an upper slot and a lower slot between the front plate assembly and the rear plate assembly;
an indicator assembly, the indicator assembly includes at least one slide indicator received at least in part in the body portion, the slide indicator capable of moving from a first position to a second position;
a pivot housing member received within the body portion, the pivot housing member having a first through channel and configured to move between a first position and a second position;
a slide bar, the slide bar received at least in part in the first through channel of the pivot housing, the pivot bar configured to move between a first position and a second position;
a biasing member, the biasing member biasing the pivot housing to the first position and biasing the slide bar to the first position;
wherein the body portion is capable of receiving at least a portion of a harness such that the harness is received through the upper and lower slots and at least engages the pivot housing,
wherein pulling on the harness causes the pivot housing and the slide bar to move from the first position to the second position and causes the indicator assembly to move from the first position to the second position.

2. The tension indicator of claim 1, wherein the indicator assembly comprises two slide indicators.

3. The tension indicator of claim 1, wherein the slide indicator includes a guide portion surrounded at least in part by a groove portion.

4. The tension indicator of claim 1, wherein the slide indicator includes a plurality of biasing members.

5. The tension indicator of claim 4, wherein the biasing members are magnets.

6. The tension indicator of claim 4, wherein the slide bar includes at least one biasing member to engage the biasing members of the slide indicator.

7. The tension indicator of claim 6, wherein the at least on biasing member of the slide bar is a magnet.

8. The tension indicator of claim 1, wherein the slide indicator includes an extension portion such that in the first position the extension portion does not extend beyond the body portion and in the second position the extension portion extends beyond the body portion.

9. The tension indicator of claim 1, wherein the front plate assembly comprises a face portion and two lateral flanges and two medial flanges.

10. The tension indicator of claim 9, wherein when the front plate assembly is coupled to the rear plate assembly, the lateral flanges engage the rear plate assembly and the medial flanges extend toward but do not engage the rear plate assembly defining the upper and lower slots.

11. The tension indicator of claim 9, further comprising a pivot bar, the pivot bar received between the lateral flanges of the front plate assembly and received within a second through channel in the pivot housing, the pivot bar serving as a pivot point for the pivot housing.

12. The tension indicator of claim 1, wherein the first through hole has an elongated cross-section.

13. The tension indicator of claim 1, wherein the biasing member is a spring element.

14. A tension indicator comprising:
a body portion comprising:
- a front plate assembly having first and second lateral flanges and first and second medial flanges;
- a rear plate assembly having a first and second leg portions,
- wherein the first and second lateral flanges respectively engage at least the first and second leg portions of the rear plate assembly, and
- wherein the first and second medial flanges and the rear plate assembly define at least in part an upper slot and a lower slot there between;

an indicator assembly, the indicator assembly comprising:
- first and second slide indicators, the first and second slide indicators each having a guide portion surrounded at least in part by a groove and each having first and second magnetic members,
- wherein the first slide indicator received at least in part in the first leg portion and the second slide indicator received at least in part in the second leg portion, and
- wherein each slide indicator capable of moving from a first position to a second position with respect to each leg portion;

a pivot housing member received between the first leg portion and the second leg portion, the pivot housing member having a first through channel and at least one transverse channel in fluid communication with the first through channel, the pivot housing member is configured to move between a first position and a second position;

a slide bar, the slide bar comprising:
- a central portion and first and second lateral ends, the first and second lateral ends each having a magnetic member,
- wherein the central portion of the slide bar received at least in part in the first through channel of the pivot housing,
- wherein the first lateral end of the slide bar received at least in part in the groove of the first slide indicator,
- wherein the second lateral end of the slide bar received at least in part in the groove of the second slide indicator, and
- wherein the slide bar is configured to move between a first position and a second position such that in a first position, the magnetic members of the slide bar engage the first magnetic members of the first and second slide indicators and in the second position, the magnetic members of the slide bar engage the second magnetic members of the first and second slide indicators;

a biasing member, the biasing member having a first end and a second end, the first end of the biasing member engaging the rear plate assembly and the second end of the biasing member extending through the transverse channel and engaging the slide bar, the biasing member biasing the pivot housing to the first position and biasing the slide bar to the first position;

wherein the body portion is capable of receiving at least a portion of a harness such that the harness is received through the upper and lower slots and at least engages the pivot housing, wherein pulling on the harness causes the pivot housing and the slide bar to move from the first position to the second position against the bias of the biasing member which causes the magnetic members of the slide bar to magnetically decouple from the first magnetic members of the first and second slide indicators and magnetically couple to the second magnetic members of the first and second slide indicators causing the first and second slide indicators to move from the first position to the second position.

15. The tension indicator of claim 14, wherein the biasing member is a spring element.

16. The tension indicator of claim 14, wherein the first and second slide indicators each include an extension portion such that in the first position the extension portion does not extend beyond the body portion and in the second position the extension portion extends beyond the body portion.

17. The tension indicator of claim 14, wherein the first and second slide indicators move from the first position to the second position simultaneously.

18. The tension indicator of claim 14, wherein the first and second slide indicators move from the first position to the second position sequentially.

19. The tension indicator of claim 14, further comprising a pivot bar, the pivot bar received between the first and second legs of the rear plate assembly and received within a second through channel in the pivot housing, the pivot bar serving as a pivot point for the pivot housing.

20. The tension indicator of claim 14, wherein the first through hole has an elongated cross-section.

* * * * *